(12) United States Patent
Bachar et al.

(10) Patent No.: US 7,068,650 B1
(45) Date of Patent: Jun. 27, 2006

(54) APPARATUS AND METHOD FOR SERDES RATE MATCHING USING SYMBOL INTERLEAVING

(75) Inventors: Yuval Bachar, Sunnyvale, CA (US); Gopakumar Parameswaran, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 995 days.

(21) Appl. No.: 09/947,689

(22) Filed: Sep. 6, 2001

(51) Int. Cl.
*H04Q 11/00* (2006.01)

(52) U.S. Cl. ...................................... 370/380; 370/535
(58) Field of Classification Search ................ 370/380, 370/366, 360, 535, 536, 537, 543, 545, 542
See application file for complete search history.

(56) References Cited

U.S. PATENT DOCUMENTS

| | | | |
|---|---|---|---|
| 5,001,711 A * | 3/1991 | Obana et al. ................ | 370/535 |
| 5,016,011 A * | 5/1991 | Hartley et al. ................ | 341/95 |
| 6,094,737 A * | 7/2000 | Fukasawa ................... | 714/738 |
| 6,253,247 B1 * | 6/2001 | Bhaskar et al. ............. | 709/237 |
| 6,775,274 B1 * | 8/2004 | Ain et al. ................... | 370/360 |

OTHER PUBLICATIONS

Agilent HDMP-2630/2631 2.125/1.0625 GBd Serdes Circuits Data Sheet [online], Dec. 14, 2000 [retrieved on Oct. 11, 2001]. Retrieved from the Internet: <URL: http://literature.agilent.com/litweb/pdf/5980-2110E.pdf>.
Agilent HDMP-1685A 1.25 Gbps Four Channel SerDes with 5-Pin DDR SSTL $_{13}$ 2 Parallel Interface Data Sheet [online] May 7, 2001 [retrieved on Oct. 11, 2001]. Retrieved from the Internet: <URL:http://literature.agilent.com/litweb/5988-2143EN.pdf>.

* cited by examiner

*Primary Examiner*—Wellington Chin
*Assistant Examiner*—Kevin Mew
(74) *Attorney, Agent, or Firm*—Charles E. Krueger

(57) ABSTRACT

A system and method for interleaving symbols to facilitate compatibility between serializer/deserializer (SerDes) units operating at different data rates multiplexes duplicates of a parallel data stream into a fast data rate serial data stream to form a serial data steam at a psuedo-slow data rate which can be received by a SerDes unit operating at the slow data rate. The psuedo-slow data rate serial data stream can also be received by a SerDes operating at the fast data rate by sampling each bit multiple times and demultiplexing the samples into duplicates of the parallel data stream.

17 Claims, 4 Drawing Sheets

APPARATUS AND METHOD FOR SERDES RATE MATCHING USING SYMBOL INTERLEAVING

BACKGROUND OF THE INVENTION

Incompatibility between new and existing products is a major problem in many technical disciplines including networking and signal switching. Often new products are developed having increased data rates but customers have invested heavily in legacy products operating at a slower data rate.

For example, high end routers are now using switched crossbars that operate at data rates up to 5 Gb/s to transfer data between line cards. However, customers may have a significant investments in line cards that operate at a slower data rate. These switched crossbars use serial links between the crossbar switches which are often implemented as Application Specific Integrated Circuits (ASICs). The ASICs are connected to serializer/deserializer (SerDes) chips which convert the parallel data processed internally by the ASIC into serial data streams which are transmitted on the backplane.

One approach to implementing data transfer between SerDes chips operating at different data rates has been to manipulate the data rate of the SerDes operating at the faster data rate. However, such approaches generally add to the complexity and power consumption of the SerDes part.

Accordingly, improved techniques for implementing backwards compatibility are required to preserve significant investments in equipment.

BRIEF SUMMARY OF THE INVENTION

According to one aspect of the invention, the use of generic SerDes parts to communicate with peers at different data rates is allowed without requiring hardware modification to the SerDes parts.

According to another aspect of the invention, SerDes parts communicate with cards via multiple channels operating at a slow data rate. At the transmit side, duplicates of a parallel data stream are provided to a SerDes which multiplexes the data at a fast data rate to generate a psuedo-slow data rate interleaved serial data stream which is transmitted at the high data rate. Because multiple duplicates of the same bit value are interleaved the serial data stream can be sampled at the slow data rate by cards that operate at the slow data rate to facilitate inter-operability between peer communicating at different data rates.

According to another aspect of the invention, serial links are included a backplane utilized to connect cards.

According to another aspect of the invention, the psuedo-slow rate serial data stream is sampled at the fast data rate and the sampled bit values are de-multiplexed to generate duplicates of the parallel data stream.

According to another aspect of the invention, an error correction scheme is implemented at the receiver that assigns a bit value based on the maximum number of channels having the same bit value.

According to another aspect of the invention, the data streams may be two-level or multi-level.

Other features and advantages of the invention will become apparent in view of the following detailed description and appended drawings.

DETAILED DESCRIPTION OF THE INVENTION

Figure 1:
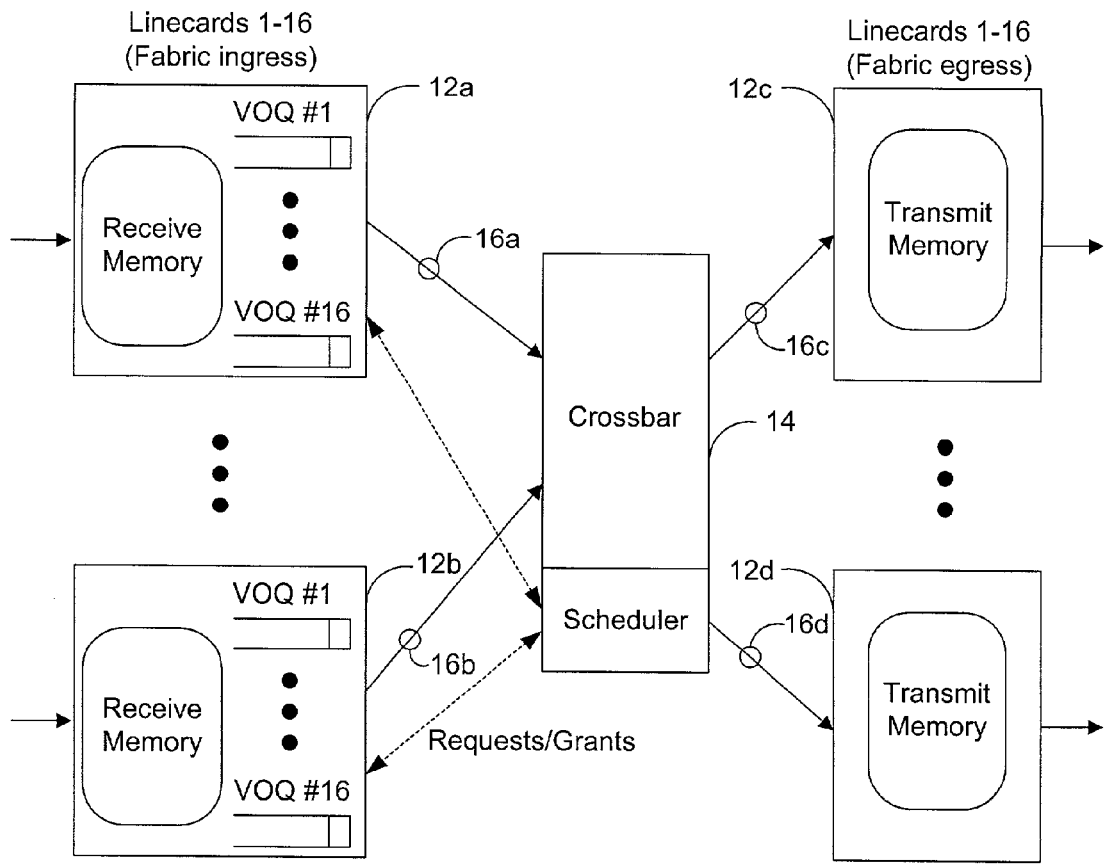
FIG. 1 is a block diagram of a non-blocking router architecture utilizing a crossbar.

The invention will now be described with reference to specific embodiments by way of example not limitation. In the drawings like or similar parts in different views have the same reference number. In the following an embodiment will be described which is utilized in a router. However, it will be apparent that the invention has general utility in many other environments.

FIG. 1 is a high level depiction of a router 10 depicting line cards 12 connected to a crossbar switch 14 by serial links 16. The crossbar includes crossbar switches in the form of ASICs coupled to a backplane formed of multiple serial links.

Modern routers are highly modular and include a chassis having multiple slots for inserting cards to perform selected functions. Line cards connect the router to other devices via electrical or optical media. The switch fabric, in this embodiment, includes switch-fabric cards and scheduler cards.

Figure 2:
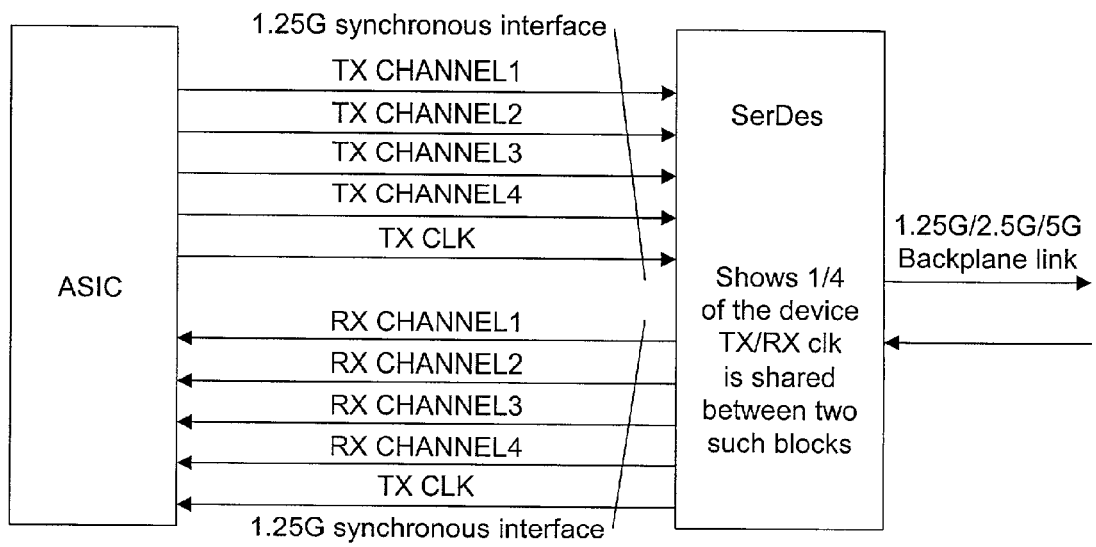
FIG. 2 is a block diagram of a SerDes interface to the backplane and ASICs.

FIG. 2 is a block diagram depicting a SerDes interface to the ASICs and the backplane. The ASIC is coupled to the SerDes by 1.25 Gb/sec transmit (Tx) and receive (Rx) parallel channels. The SerDes converts the parallel data streams received on the parallel channels to a serial data stream and converts a received serial data stream into parallel data streams as is known in the art.

Each card connected to a serial link includes a SerDes unit for transforming data between serial and parallel formats. As depicted in FIG. 2, in this embodiment a SerDes operating a 2.5 Gb/sec data rate is utilized. Each ASIC is connected to the SerDes by multiple parallel 1.25 Gb/sec channels.

However, as described above, many of the line cards in the router may be legacy parts that operate at a slower data rate, in this example 1.25 Gb/sec. For example, referring to FIG. 1, the crossbar 14, and first, second, and fourth line cards 12a, b, and d operate at 2.5 Gb/sec while a third Line Card 12c is legacy card that operates at a slow data rate of 1.25 Gb/sec. The third line card 12c includes a 1.25 Gb/sec SerDes coupled to a third serial link 16c. However, the SerDes connected to the other end of the third link is operating at a faster data rate, for example 2.5 Gb/sec. An embodiment for transmitting data at a slower data rate will now be described with reference to FIGS. 3–6.

Figure 3:
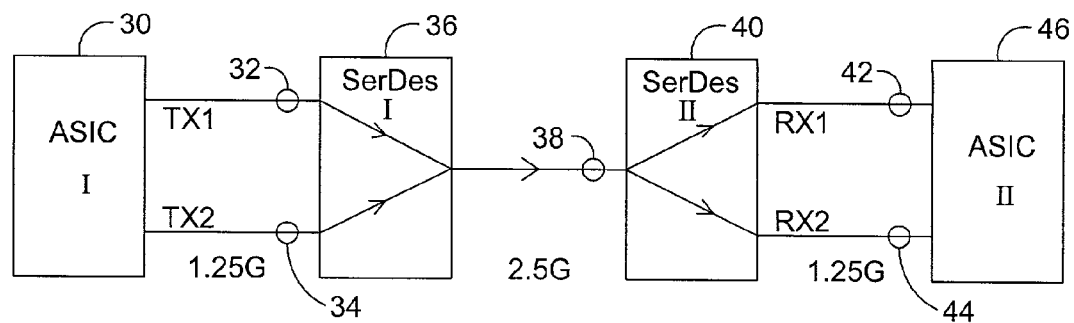
FIG. 3 is a block diagram of a SerDes interface to the backplane and ASICs depicting two parallel channels.

FIG. 3 depicts a first ASIC 30 coupled by first and second 1.25 Gb/sec parallel Tx channels 32 and 34 to a first SerDes 36. The first SerDes 32 multiplexes the first and second parallel Tx channels onto a 2.5 Gb/sec serial channel 38 which can be part of the backplane. A second SerDes 40 receives the data on the serial channel 38 and demultiplexes the data onto second and third 1.25 Gb/sec Rx parallel channels 42 and 44 coupled to a second ASIC 46.

Figure 4:
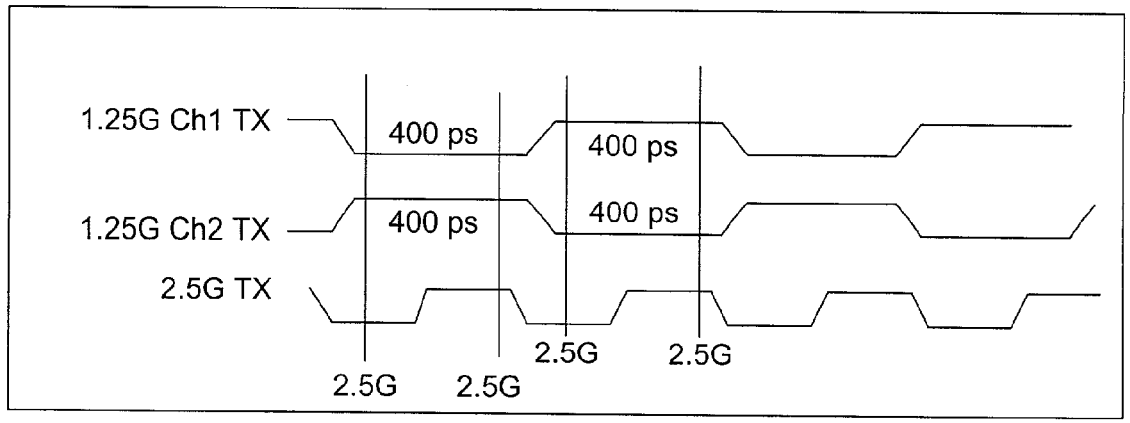
FIG. 4 is a timing diagram of the standard operation of the system depicted in FIG. 2.

The bit values on the first and second parallel Tx channels 42 and 44 and the serial channel 38 are depicted in FIG. 4. The bits are sampled (the sampling clock is indicated by vertical lines) at 2.5 Gb/sec and interleaved for transmission on the serial channel by the first SerDes 36 and are sampled at 2.5 Gbit/sec by the second SerDes 46 and demultiplexed. FIG. 4 only depicts transmission from the first to the second ASIC. However, transmission in the other direction is similarly implemented.

Figure 5:
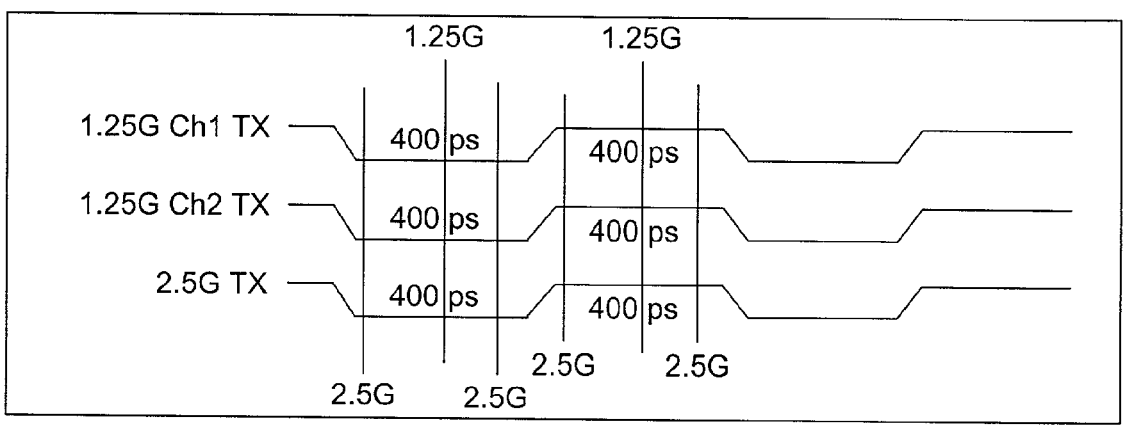
FIG. 5 is a timing diagram illustrating the operation of an embodiment of the invention utilizing two parallel channels.

As depicted in FIG. 4, the 2.5 G two level serial stream is generated by bit interleaving Tx1 and Tx2 to one 2.5 G channel. In FIG. 5, the ASIC provides the same data on both Tx1 and Tx2 so that the interleaved data will operate like a 1.25 G serial stream. In the receive direction the SerDes provides the same data on Tx1 and Tx2. Since a standard CML SerDes does not have pre-emphasis the data from the backplane will be of poor quality and the signal must be regenerated at the input of the SerDes (sampling each bit twice).

The operation of an embodiment of the invention is depicted in FIG. 5. In this example a psuedo—1.25 Gb/sec serial channel is formed by transmitting duplicates of a 1.25 Gbit/sec data stream on the first and second 1.25 Gbit/sec parallel Tx channels which are multiplexed onto the serial channel by the first SerDes 36. The resulting serial data stream is the same as the 1.25 Gbit/sec data stream transmitted on the first and second parallel Tx channels and thus can be processed by a 1.25 Gbit/sec legacy ASIC. The 1.25 Gb/sec sampling clock is indicated in FIG. 5. At the second SerDes 46, the serial data stream is sampled at 2.5 Gbit/sec and demultiplexed onto the Rx1 and Rx2 parallel channels. Each bit is sampled twice so that the identical data 1.25 Gbit/sec data streams are received on each parallel channel.

Accordingly, the transmission of multiple duplicates of the same data to the SerDes operating at the fast data rates facilitates the generation of a data stream that can be processed by a SerDes operating at a slow data rate or a fast data rate.

Figure 6A:
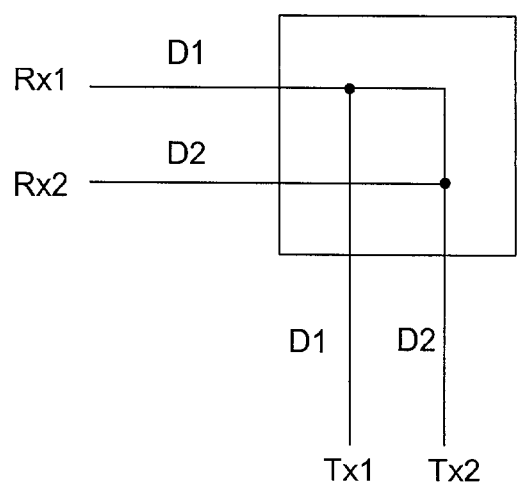
FIGS. 6A and B are schematic diagrams depicting the configuration of a crossbar.

Upon start up the router senses the data rate of each ASIC and configures the correct data transmission on the parallel channels to assure compatibility between ASICs operating at different data rates. For example, FIGS. 6A and B depict a crossbar switch having two parallel 1.25 Gb/sec input ports Rx1 and Rx2 and two parallel 1.25 Gb/sec output ports Tx1 and Tx2. In FIG. 6A the crossbar is configured to operate as depicted in FIG. 4 with different parallel data streams output on each of the Tx ports. As described with reference to FIG. 4, the bits from each parallel data stream will be interleaved in the serial data stream.

Figure 6B:
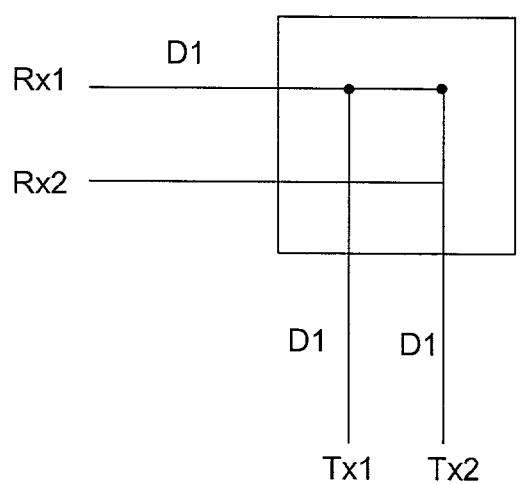

In FIG. 6B, the crossbar is configured to operate as depicted in FIG. 5 with duplicates of an input parallel data stream output on each of the Tx ports. Thus, when the duplicate data are interleaved a psuedo—1.25 Gb/sec serial data stream is produced.

The transmission of a psuedo—2.5 Gbit/sec serial channel by SerDes units that transmit at 5 Gbit/sec is implemented utilizing the technique describe above.

Figure 7:
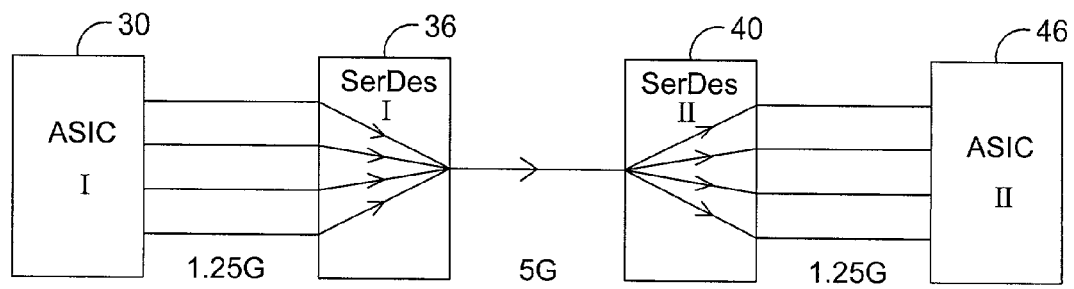
FIG. 7 is a block diagram of a SerDes interface to the backplane and ASICs depicting four parallel channels.

The technique for transmission of a psuedo—1.25 by SerDes units that transmit and receive at 5 Gbit/sec is depicted in FIG. 7. In this case, the 1.25 Gbit/sec serial channel is formed by transmitting duplicates of the 1.25 Gbit/sec data stream on four 1.25 Gbit/sec parallel Tx channels which are multiplexed onto the serial channel by the first SerDes at 5 Gbit/sec. The resulting serial data stream is the same as the 1.25 Gbit/sec data stream transmitted on the four parallel Tx channels and thus can be processed by a 1.25 Gbit/sec legacy ASIC. The serial data stream is sampled at 5 Gbit/sec and demultiplexed onto the four parallel channels. Each bit is sampled four times so that the identical data 1.25 Gbit/sec data streams are received on each parallel channel.

In general, the data rate of the serial data stream transmitted at the fast data rate can be reduced by a factor of 1/N where N is an integer divisor of the fast data rate. N duplicates of the data transmitted at the slow rate must be provided to the SerDes to be multiplexed onto the serial channel to form a psuedo—(fast clock/N) b/sec data stream. For example if the fast data rate is 5 Gbit/sec and N is 8 a psuedo—625 Mbit/sec serial data stream is transmitted. If the fast data rate is 1.875 Mb/sec and N is 3 then a psuedo—625 Mb/sec serial data stream is transmitted.

Figure 8:
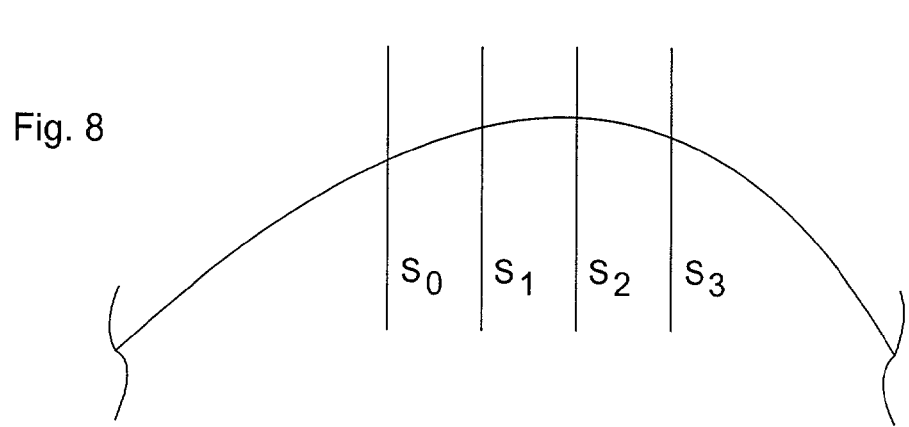
FIG. 8 is a timing diagram depicting an embodiment of an error correction technique.

As described above, with reference to FIG. 8, at the second SerDes each bit is sampled four times and demultiplexed onto four parallel channels. As is known in the art, the error rate increases for samples near a transition. Thus, referring to FIG. 7, the actual form of the signal does not have the sharp transitions of the idealized signal of FIGS. 4 and 5 but is more rounded as in FIG. 7. Thus, as is known in the art, the error rate for the samples, s0 and s3, near the transition of the bit value is higher than for the samples, s1 and s2, near the center of the bit value.

In one embodiment, an error correction algorithm is implemented that takes advantage of the redundancy of the data stream. Because the bit value in the transmitted data stream is equal to four sample periods a voting scheme is used to determine the value of the bit. The bit voting scheme is implemented that checks the values of the sampled bits on all four channels and makes a decision based on the maximum number of channels having the same bit value. This bit value is then transmitted on all four channels.

In one embodiment the error correction scheme is implemented in a look up table (LUT). The sampled values are used to address the LUT and the value equal to the maximum value of the sampled value is output.

The invention has now been described with reference to the preferred embodiments. Alternatives and substitutions will now be apparent to persons of skill in the art. In particular, the embodiments have been described in the context of a router, however, the invention is useful in any environment that requires compatibility between components operating at different data rates. Additionally, the embodiments described utilize two level signals (high and low). However, the principles of the invention are also applicable to multi-level signals, for example PAM-4 encoded signals. Accordingly, it is not intended to limit the invention except as provided by the appended claims.

What is claimed is:

1. A method for transferring data between first and second serial/deserializer (SerDes) units, coupled by a serial link and operating, respectively, at a fast and a slow data rate, with the fast data rate equal to the slow data rate multiplied by N, where N is an integer, with the first SerDes unit coupled to a first data source/sink by a parallel interface, operating at the slow data rate, and having N parallel channels, and with the second SerDes unit coupled to a second data/source sink by a parallel interface, operating at the slow data rate, and having at least one parallel channel said method comprising the acts of:

at the first data source/sink, transmitting duplicates of a first data stream from the data source/sink to the first SerDes unit, on each of the N parallel channels, with the first data stream transmitted at the slow data rate;

at the first SerDes unit, interleaving the duplicates of the first data stream received from the N channels into a first serial interleaved data stream transmitted at the fast data rate;

at the first SerDes unit, transmitting the first serial interleaved data stream to the second SerDes unit over the serial link;

at the second SerDes unit, sampling the first serial interleaved data stream as the slow data rate to recover duplicates of the first parallel data stream; and at the second data source sink, receiving the first data stream from the second SerDes.

2. The method of claim 1 further comprising the acts of:

at the second SerDes unit, receiving a second data stream from the second data source/sink and converting the second data stream into a second serial data stream;

at the second SerDes unit, transmitting the second serial data stream at the slow data rate onto the serial link;

at the first SerDes unit, receiving the second serial data stream and sampling the second serial data stream at the fast data rate to obtain N duplicates of the second data stream;

at the first SerDes unit, transmitting one of the N duplicates of the second transmitted data stream to the first data source/sink on each of the N parallel channels.

3. The method of claim 1 further comprising the acts of:

at the second SerDes unit, receiving a second data stream from the second data source/sink and converting the second data stream into a second serial data stream;

at the second SerDes unit, transmitting the second serial data stream at the slow data rate onto the serial link;

at the first SerDes unit, receiving the second serial data stream and sampling the second serial data stream at the fast data rate to obtain N duplicates of the second data stream;

at the first SerDes unit, determining a maximum bit value equal to the bit value of a maximum number of said N samples; and at the first SerDes unit, assigning the maximum bit value as the bit value of the sampled bit in the second data stream.

4. A system for transferring data between serial/deserializer (SerDes) units operating at different data rates, said system comprising:

a first ASIC, having N parallel Tx ports, N being a positive integer, operating at a slow data rate, with the first ASIC configured to output duplicates of a first data stream on each of the N Tx ports;

a serial link, a first SerDes unit, having N parallel ports operating at the slow data rate coupled to the N Tx ports of the first ASIC, and a serial port, operating at a fast data rate equal to the slow data rate multiplied by N, coupled to the serial link, with the first SerDes unit multiplexing N data streams received at the parallel ports into a first serial data stream for transmission at the serial port, with the first serial data stream transmitted at the fast data rate to interleave the bits from the N parallel channels onto the serial data stream;

a second SerDes unit, having a parallel port operating at the slow data rate and a serial port, operating at the slow data rate, with the second SerDes unit sampling the first serial data stream at the slow data rate to recover the first data stream and outputting the first data stream at the parallel port at the slow data rate; and a second ASIC, having a parallel Rx port coupled to the serial port of the second SerDes unit to receive the first data stream.

5. The system of claim 4 further comprising:

a third SerDes, having N parallel ports operating at the slow data rate and a serial port operating at the fast data rate coupled to the serial link, with the third SerDes sampling the serial data stream at the fast data rate and outputting duplicates of the first data stream on the N parallel ports.

6. A system for transferring data between serial/deserializer (SerDes) units operating at different data rates, said system comprising:

a first ASIC, having N parallel Rx ports and N, N being a positive integer, parallel Tx ports operating at a slow data rate, with the first ASIC configured so that a single Rx port is connected to all N Tx ports;

a first SerDes unit, operating at a fast data rate equal to the slow data rate multiplied by N, and coupled to the N Tx ports of the first ASIC, with the first SerDes unit for multiplexing N duplicates of a first data stream onto a first serial data stream transmitted at the fast data rate to interleave the bits from the N parallel channels onto the serial data stream;

a second SerDes unit, having a parallel port operating at the slow data rate and a serial port, operating at the slow data rate, with the second SerDes unit sampling the first serial data stream at the slow data rate to recover the first data stream and outputting the first data stream at the parallel port at the slow data rate; and a second ASIC, having a parallel Rx port, operating at the slow data rate, coupled to parallel port of the second ASIC to receive the first data stream.

7. A method for transferring data between first and second serial/deserializer (SerDes) units, coupled by a serial link and clocking serial data at, respectively, a fast and a slow data rate, with the fast data rate equal to the slow data rate multiplied by N, where N is an integer, method comprising the acts of:

at the first SerDes unit, receiving N duplicates of a first data stream transmitted a the slow data rate and interleaving the N duplicates into a first serial interleaved data stream transmitted at the fast data rate;

at the first SerDes unit, transmitting the first serial interleaved data stream to the second SerDes unit over the serial link;

at the second SerDes unit, sampling the first serial interleaved data stream as the slow data rate to recover and output the first data stream.

8. The method of claim 7 further comprising the acts of:

at the second SerDes unit, transmitting a second serial data stream, transmitted at the slow data rate, onto the serial link;

at the first SerDes unit, receiving the second serial data stream and sampling the second transmitted data stream at the fast data rate to generate and output N duplicates of a second data stream.

9. The method of claim 7 further comprising the acts of:

at the second SerDes unit, transmitting a second serial data stream, transmitted at the slow data rate, onto the serial link;

at the first SerDes unit, receiving the second transmitted data stream and sampling the second transmitted data stream at the fast data rate to obtain N sample values of each bit in the second data stream;

at the first SerDes unit, determining a maximum bit value equal to the bit value of a maximum number of said N samples; and at the first SerDes unit, assigning the maximum bit value as the bit value of the sampled bit in the second transmitted data stream.

10. A system for transferring data between serial/deserializer (SerDes) units operating at different data rates, said system comprising:

a serial link, a first SerDes unit, having N parallel ports operating at the slow data rate, and a serial port, operating at a fast data rate equal to the slow data rate multiplied by N, coupled to the serial link, with the first SerDes unit multiplexing N duplicates of a first data stream received at the parallel ports into a first serial data stream for transmission at the serial port, with the first serial data stream transmitted at the fast data rate to interleave the bits from the N parallel channels onto the serial data stream;

a second SerDes unit, having a parallel port operating at the slow data rate and a serial port, operating at the slow data rate, with the second SerDes unit sampling the first serial data stream at the slow data rate to recover the first data stream transmitted at the slow data rate and outputting the first data stream on the parallel port.

11. The system of claim 10 further comprising:

a third SerDes, having N parallel ports operating at the slow data rate and a serial port operating at the fast data rate coupled to the serial link, with the third SerDes sampling the first serial data stream at the fast data rate and outputting duplicates of the first data stream on the N parallel ports.

12. The system of claim 10 wherein:

the serial link is part of a backplane.

13. The system of claim 10 wherein:

the serial and first data streams are two-level data streams.

14. The system of claim 10 wherein:

the serial and first data streams are multi-level data streams.

15. A system for transferring data between first and second serial/deserializer (SerDes) units, coupled by a serial link and clocking serial data at, respectively, a fast and a slow data rate, with the fast data rate equal to the slow data rate multiplied by N, where N is an integer, said system comprising:

means, at the first SerDes unit, for receiving N duplicates of a first parallel data stream transmitted a the slow data rate and interleaving the N duplicates into a first serial interleaved data stream transmitted at the fast data rate;

means, at the first SerDes unit, for transmitting the first serial interleaved data stream to the second SerDes unit over the serial link;

means, at the second SerDes unit, for sampling the first serial interleaved data stream as the slow data rate to recover and output the first data stream.

16. The system of claim 15 further comprising:

at the second SerDes unit, means for transmitting a second serial data stream, transmitted at the slow data rate, onto the serial link;

at the first SerDes unit, means for receiving the second serial data stream and sampling the second transmitted data stream at the fast data rate to generate and output N duplicates of a second data stream.

17. The system of claim 15 further comprising:

at the second SerDes unit, means for transmitting a second serial data stream, transmitted at the slow data rate, onto the serial link;

at the first SerDes unit, means for receiving the second transmitted data stream and sampling the second transmitted data stream at the fast data rate to obtain N sample values of each bit in the second data stream;

at the first SerDes unit, means for determining a maximum bit value equal to the bit value of a maximum number of said N samples; and at the first SerDes unit, means for assigning the maximum bit value as the bit value of the sampled bit in the second transmitted data stream.

* * * * *